United States Patent

Paltenghe et al.

(10) Patent No.: US 10,282,702 B2
(45) Date of Patent: May 7, 2019

(54) DYNAMIC EMPLOYEE SECURITY RISK SCORING

(75) Inventors: Cris T. Paltenghe, Spirit Lake, ID (US); Igor Baikalov, Thousand Oaks, CA (US); Craig Kirby, Burbank, CA (US); Ravi Pritmani, Irving, TX (US); Craig Froelich, Thousand Oaks, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 1853 days.

(21) Appl. No.: 12/651,645

(22) Filed: Jan. 4, 2010

(65) Prior Publication Data

US 2011/0167011 A1    Jul. 7, 2011

(51) Int. Cl.
  *G06Q 10/06* (2012.01)
  *G06Q 10/10* (2012.01)
  *G06Q 50/26* (2012.01)

(52) U.S. Cl.
  CPC ............. *G06Q 10/10* (2013.01); *G06Q 10/06* (2013.01); *G06Q 10/105* (2013.01); *G06Q 50/265* (2013.01)

(58) Field of Classification Search
  USPC .............................. 707/804; 726/25; 705/320
  See application file for complete search history.

(56) References Cited

U.S. PATENT DOCUMENTS

| | | | | |
|---|---|---|---|---|
| 6,859,788 B1 * | 2/2005 | Davey | ..................... | G06Q 40/06 705/36 R |
| 7,769,653 B2 * | 8/2010 | Rousseau et al. | .............. | 705/35 |
| 2003/0154393 A1 * | 8/2003 | Young | ................... | G06F 21/577 726/25 |
| 2005/0080720 A1 * | 4/2005 | Betz et al. | ....................... | 705/38 |
| 2006/0004814 A1 * | 1/2006 | Lawrence | .............. | G06Q 40/08 |
| 2006/0136462 A1 * | 6/2006 | Campos et al. | .............. | 707/102 |
| 2006/0191012 A1 | 8/2006 | Banzhof et al. | | |
| 2007/0143851 A1 | 6/2007 | Nicodemus et al. | | |
| 2008/0306826 A1 * | 12/2008 | Kramer et al. | ................. | 705/14 |
| 2009/0178142 A1 * | 7/2009 | Lieblich | ................ | G06F 21/316 726/25 |

(Continued)

OTHER PUBLICATIONS

The International Search Report and The Written Opinion of the International Searching Authority dated Apr. 5, 2011 for International Application No. PCT/US 11/20082.

(Continued)

*Primary Examiner* — Andrew B Whitaker
(74) *Attorney, Agent, or Firm* — Michael A. Springs; Moore & Van Allen PLLC; James C. Edwards (57) ABSTRACT

Embodiments of the invention relate to systems, methods, and computer program products that provide for an employee security risk score. The security risk score is presented as an extensible composite vector that supports an arbitrary number of risk categories. The risk categories can be aggregated at any level in the business hierarchy or according to any employee parameter. The simplistic, highly normalized approach to employee security risk scoring reduces redundancies and dependencies and provides for real-time updates, As such, the employee security risk scoring system provides for easily identifiable recognition of employees who pose security threats and for a means to track and monitor security risks posed by the employee based on their security risk score.

8 Claims, 7 Drawing Sheets

(56) References Cited

U.S. PATENT DOCUMENTS

2011/0054961 A1* 3/2011 DelZoppo .............. G06Q 10/10
705/7.28

OTHER PUBLICATIONS

The International Bureau of WIPO. PCT International Preliminary Report on Patentability and Written Opinion dated Jul. 4, 2012. International Application No. PCT/US2011/020082. International Filing Date: Jan. 4, 2011. Name of Applicant: Bank of America Corporation. English Language. 12 pages.

* cited by examiner

DYNAMIC EMPLOYEE SECURITY RISK SCORING

FIELD

In general, embodiments of the invention relate to methods, systems, apparatus and computer program products for managing security risk associated with employees and, more particularly, quantifying an employee security risk score to identify employees who may pose a security threat and/or warrant further surveillance.

BACKGROUND

Businesses, such as financial institutions and the like, place a significant emphasis on preventing security related issues. Up until recently, most of the emphasis was placed on preventing external individuals (i.e., individuals not associated with or employed by the business) from comprising or otherwise exposing the business to security risks. However, historical data has shown that the vast majority of security risks for business, such as financial institutions or the like, are related to inside individuals (i.e., employees or the like).

For the most part, internal security emphasis has been limited to assessing hardware. This includes assessing hardware to determine vulnerabilities, open shares, out-of-date virus signatures, absence of critical services, compliances and the like. Such assessments identify hardware that is of a higher security risk so that preventive measures can be taken, such as further monitoring of the hardware or, in some instances, expunging the hardware from the business inventory. However, the need to assess employees has shown to provide an equal or even greater value to security risks, such as insider threat management, forensics and other types of investigations.

While security assessments, in the form of background checks, credit checks and the like, have been used by human resources (HR) departments and the like as a means of assessing the security risk posed by prospective employees, no such system exists to assess and/or track the security risk posed by employees once they have been hired. In this regard, the assessments made during the pre-hiring stage, such as background checks, credit checks and the like have little relevancy to the assessing the internal security risk once the individual becomes an employee. Moreover, the assessments made during pre-hiring stage tend to be intrusive, time-consuming and costly.

Therefore, a need exists to develop systems, apparatus, computer program products and the like that identify, track and manage security risks posed by employees. In this regard, the desired systems should provide for quantifying the security risk posed by employees, such that those employees that pose security risks can be readily identified and further measures taken to ensure the risk does not evolve into a threat. In addition, the desired system should be highly normalized to remove redundancies and/or dependencies, thus, resulting in a simple yet flexible approach to identifying and managing employees that pose a security risk. In this regard, the desired system should provide for assessing risk at any level within the business hierarchy, such as at a job title level, a business unit level or the like so that the quantification of risk is normalized across the chosen level of the business hierarchy. Moreover, the desired system should provide for distinguishing between the level of risk that is acceptable for a specific job title, job class, department or the like, and the level of risk that exceeds the acceptable level. Additionally, the desired system should be readily adaptable to support identification and tracking of any burgeoning security risks within the business.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention relate to systems, apparatus, methods, and computer program products for employee security risk scoring. The systems, apparatus and the like provide for a simple, highly normalized approach to scoring employee security risk and updating the security risk score dynamically in real time based on changes to security risk facts or new security risk facts. In the detailed embodiments, risk is presented as an extensible composite vector that supports an arbitrary number of risk components, otherwise referred to herein as risk categories. New risk categories associated with newly identified risks or the like can be readily added to the composite vector without adversely impacting the overall scoring system. In addition, the risk categories can be aggregated at any level within the business hierarchy, such as job title level, business unit level or the like, for providing the requisite detail for reporting and analysis purposes.

A method for quantifying employee security risk defines a first embodiment of the invention. The method includes receiving, at a computing device, a plurality of security risk facts associated with an employee. The method further includes determining, via a computing device processor, an employee security risk score based on the plurality of security risk facts and storing, at computing device memory, the employee security risk score.

According to specific embodiments of the method, receiving the plurality of security risk facts further includes receiving the plurality of security risk facts, wherein each security risk fact is associated with one of a plurality of security risk categories. In further specific embodiments the risk categories may include, but are not limited to, (1) access to non-public information, (2) consumption of non-public information, (3) ability to export data from an employer device, (4) risk triggering events, (5) hardware encountered and security risk of hardware encountered and (6) high-risk user indicators.

In still further specific embodiments of the method, determining the employee security risk score further includes determining, via a computing device processor, a security risk category score for each of the plurality of security risk categories. Thus, in further specific embodiments determining the risk category score further includes aggregating, via a computing device processor, the security risk facts associated with a security risk category to determine the security risk category score. In still further related specific embodiments the method may include applying a predetermined weight to one or more of the security risk facts based on security risk significance prior to determining the security risk category score.

According to additional specific embodiments of the method, determining the employee security risk score further includes determining, via a computing device processor, for each of the plurality of security risk categories and for a predetermined employee parameter, a security risk category average and a security risk category standard deviation. The predetermined employee parameter may include a level of hierarchy within the business, such as job title level, a business unit level or the like.

In other specific embodiments of the method determining the employee risk score further includes determining, via a computing device processor, an employee parameter-specific sigma score for each of the plurality of security risk categories based on the security risk category score, the security risk category average and the security risk category standard deviation. In such embodiments, determining the employee parameter-specific sigma score further includes subtracting the security risk category average from the security risk category score to result in a remainder and dividing the remainder by the security risk category standard deviation. In further related specific embodiments, determining the employee risk score further includes aggregating all positive-valued employee parameter-specific sigma scores to result in the employee risk score. Such aggregation may include applying a predetermined weight to one or more of the sigma scores associated with a security risk category, the weighting being based on the significance of the security risk category in relation to the overall employee risk score.

Another method for quantifying employee security risk provides for another embodiment of the invention. The method includes receiving, at a computing device, a plurality of security risk facts. Each security risk fact is associated with one of a plurality of security risk categories. The method further includes determining, via a computing device processor, a security risk category score for each of the plurality of security risk categories based on one or more security risk facts associated with the security risk category. Additionally the method includes determining, via a computing device processor, for each of the plurality of security risk categories and for a predetermined employee parameter, a security risk category average and a security risk category standard. Further, the method includes determining, via a computing device processor, an employee parameter-specific sigma score for each of the plurality of security risk categories based on the security risk category score, the security risk category average and the security risk category standard deviation. Lastly, the method includes determining, via a computing device processor, an employee risk score associated with the employee parameter based on the employee-parameter specific sigma score for each of the plurality of security risk categories.

An apparatus for quantifying employee security risk defines a further embodiment of the invention. The apparatus includes a computing platform including at least one processor and a memory. The apparatus additionally includes an employee security risk scoring module that is stored in the memory, executable by the processor, and configured to receive a plurality of security risk facts associated with an employee. The module includes an employee security risk scoring logic configured to determine an employee security risk score based on the plurality of security risk facts.

In specific embodiments of the apparatus, the employee security risk scoring module is further configured to receive the plurality of security risk facts, wherein each security risk fact is associated with one of a plurality of security risk categories. The security risk categories may include, but are not limited to, (1) access to non-public information, (2) consumption of non-public information, (3) ability to export data from an employer device, (4) risk triggering events, (5) hardware encountered and security risk of hardware encountered and (6) high-risk user indicators.

In alternate specific embodiments of the apparatus, the employee security risk scoring logic further includes a security risk category scoring routine configured to determine an employee-specific security risk category score for each of the plurality of security risk categories. In such embodiments, the employee security category routine may be further configured to aggregate the security risk facts associated with a security risk category to determine the security risk category score. On specific embodiments of the apparatus, the employee security risk scoring module may include a security risk fact weighting mechanism configured to apply a predetermined weight to one or more of the security risk facts based on security risk significance prior to determining the security risk category score.

In other specific embodiments of the apparatus, the employee security risk scoring logic further includes a security risk category average routine configured to determine a security risk category average for each of the plurality of security risk categories and for employees defined by a predetermined employee parameter. The employee security risk scoring logic further includes a security risk category standard deviation routine configured to determine a security risk category standard deviation for each of the plurality of security risk categories and for employees defined by a predetermined employee parameter.

In still further specific embodiments of the apparatus, the employee security risk scoring logic further a sigma scoring routine configured to determine an employee parameter-specific sigma score for each of the plurality of security risk categories based on the security risk category score, the security risk category average and the security risk category standard deviation. In specific embodiments, the sigma scoring routine is further configured to subtract the security risk category average from the security risk category score to result in a remainder and divide the remainder by the security risk category standard deviation to result in the sigma score. In such embodiments, the employee risk scoring logic may be further configured to aggregate all positive-valued employee parameter-specific sigma scores to result in the employee risk score. The employee risk scoring logic may also be configured to apply a predetermined weight to one or more of the sigma scores associated with a security risk category, the weighting being based on the significance of the security risk category in relation to the overall employee risk score.

In other embodiments of the apparatus, the employee security risk scoring module is configured to provide for dynamic user-addition or user-subtraction to the plurality of security risk categories without requiring change to the employee security risk scoring logic. In this regard, security risk categories can be flexibly added or subtracted and automatically factored into subsequent employee risk scoring determinations, without adversely impacting (i.e., requiring system and/or software changes) the overall employee risk scoring system.

Another apparatus for quantifying employee security risk provides yet another embodiment of the invention. The apparatus includes a computing platform including at least one processor and a memory. The apparatus further includes an employee security risk scoring module that is stored in the memory, executable by the processor and configured to receive a plurality of security risk facts associated with an employee and one of a plurality of security risk categories. The module includes an employee security risk scoring logic configured to determine an employee security risk score based on the plurality of security risk facts. The logic includes a security risk category routine configured to determine a security risk category score for each of the plurality of security risk categories based on one or more security risk facts associated with the security risk category. The logic further includes a security risk category average routine configured to determine a security risk category average for each of the plurality of security risk categories and for employees defined by a predetermined employee parameter. Moreover, the logic includes a security risk category standard deviation routine configured to determine a security risk category standard deviation for each of the plurality of security risk categories and for employees defined by a predetermined employee parameter. Further, the logic includes a sigma scoring routine configured to determine an employee parameter-specific sigma score for each of the plurality of security risk categories based on the security risk category score, the security risk category average and the security risk category standard deviation. The employee security risk scoring logic is further configured to determine the employee risk score associated with the employee parameter based on the employee-parameter specific sigma score for each of the plurality of security risk categories.

A computer program product defines a further embodiment of the invention. The computer program product includes a computer-readable medium. The medium includes a first set of codes for causing a computer to receiving a plurality of security risk facts associated with an employee. The medium additionally includes a second set of codes for causing a computer to determine an employee security risk score based on the plurality of security risk facts. Additionally the medium includes a third set of codes for causing a computer to store the employee security risk score.

Thus, systems, apparatus, methods, and computer program products described in detail below provide for an employee security risk score. The risk score herein described is presented as an extensible composite vector that supports an arbitrary number of risk categories. The risk categories can be aggregated at any level in the business hierarchy or according to any employee parameter. The simplistic, highly normalized approach to employee security risk scoring reduces redundancies and dependencies and provides for real-time updates, As such, the employee security risk scoring system provides for easily identifiable recognition of employees or any other group of employees defined by a predetermined employee parameter who pose security threats and for a means to track and monitor security risks posed by the employee or by the group of employees based on their security risk score.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS
OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages. In addition, the computer program code for executing operations of the present invention can be implemented in any other data processing environment, for example a spreadsheet application or the like.

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Thus, present embodiments herein disclosed provide for quantifying employee security risk in terms of an employee security risk score. The score allows employers to identify and track employees that pose a threat for internal security violations. The proposed scoring system provides a flexible and highly normalized approach to gauging an employee's security risk. The system provides for real time update of employee's security risk score based on real-time receipt of security risk facts associated with the employee.

In addition, according to certain embodiments, the security risk score is presented as an extensible composite vector that supports an arbitrary number of risk categories. As such as new security threats are identified, warranting new risk categories, the risk categories can be readily added to the composite vector without negatively impacting the overall scoring system.

Additionally, according to other embodiments, the security risk score may be aggregated at any employee parameter, such as level within the employer hierarchy, such as job title level, business unit level or the level and/or an employee identifying characteristic, such as geographical location/country, salary, length of employment or the like. As such, present embodiments, take into account the fact that security risks will vary across different factions of the business and what may be considered an acceptable level of security risk for one employee parameter may not be an acceptable level of security risk for another employee parameter. For example, one job type may have certain acceptable threshold for security risk based on the job functions, while another job type may have much lower or higher acceptable threshold for security risk based on that job type's functions. Hence, by providing for scoring based on predetermined and employer chosen employee parameters, such as levels of hierarchy within the business, the employer can better understand specifically which employees pose a security risk.

Figure 1:
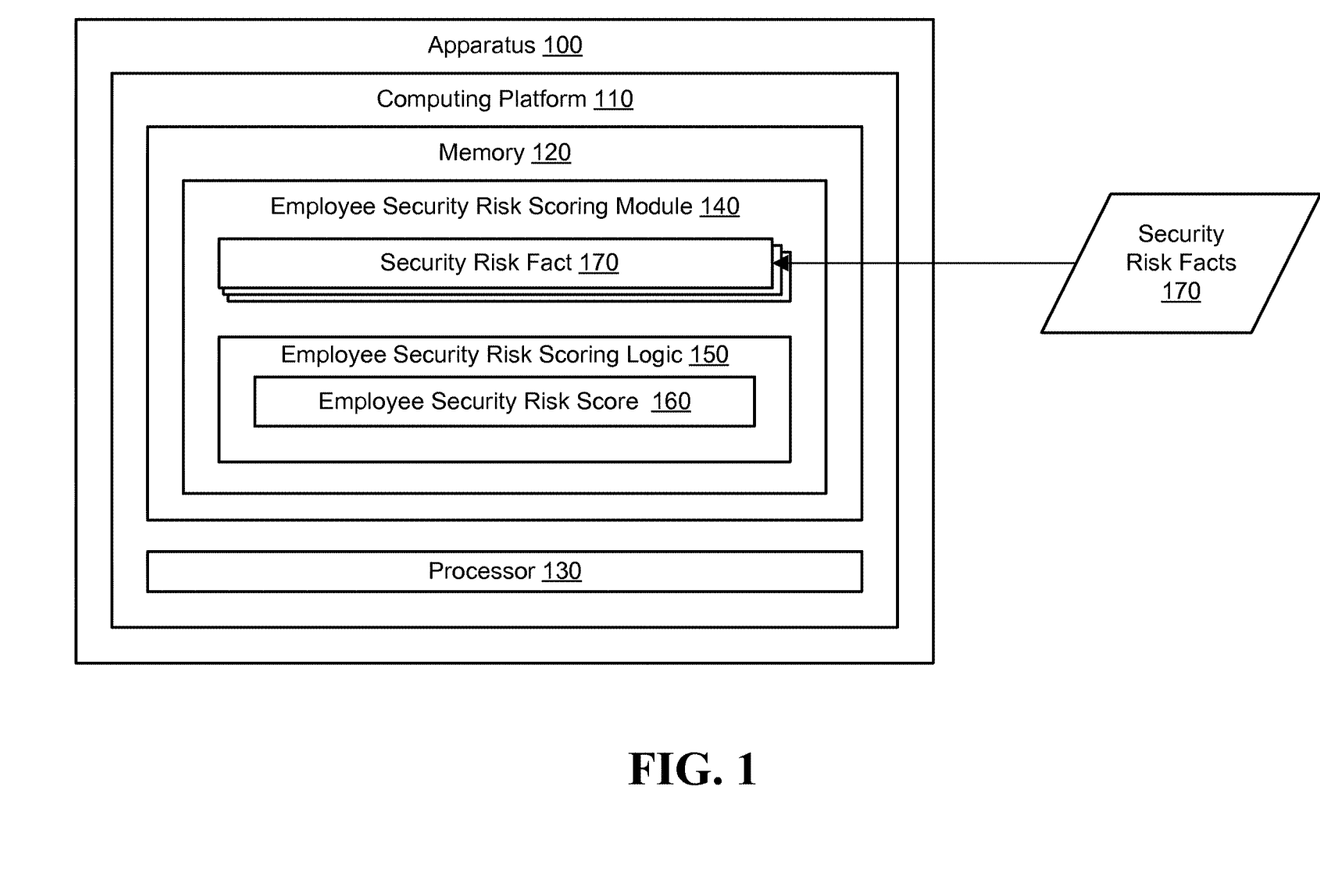
FIG. 1 is a block diagram of an apparatus for quantifying employee security risk, in accordance with embodiments of the present invention.

Referring to FIG. 1 a block diagram is depicted of an apparatus 100 configured for providing employee security risk scoring, in accordance with embodiments of the present invention. The apparatus includes a computing platform 110 having a memory 120 and at least one processor 130. The memory 120 stores an employee security risk scoring module 140. The module 140 includes employee security risk scoring logic 150 that is configured to determine an employee security risk score 160 based on a plurality of received, employee-specific, security risk facts 170.

In specific embodiments of the invention, the security risk facts are associated with a predetermined security risk category. In such embodiments, employee security risk scoring logic 150 may be configured to determine a category security risk score, otherwise referred to as a raw category score, for each of the predetermined security risk categories. In certain embodiments, the category security risk score is determined by aggregating all of the security risk facts 170 within the security risk category. In such embodiments, the security risk facts 170 within a security risk category may be weighted to emphasize or de-emphasize one or more of the security risk facts in the calculation of the category security risk score. As discussed further in relation to FIGS. 3, 5 and 6, in specific embodiments of the invention, the category security risk scores are subsequently used in further calculations to determine the employee security risk score 160.

Figure 2:
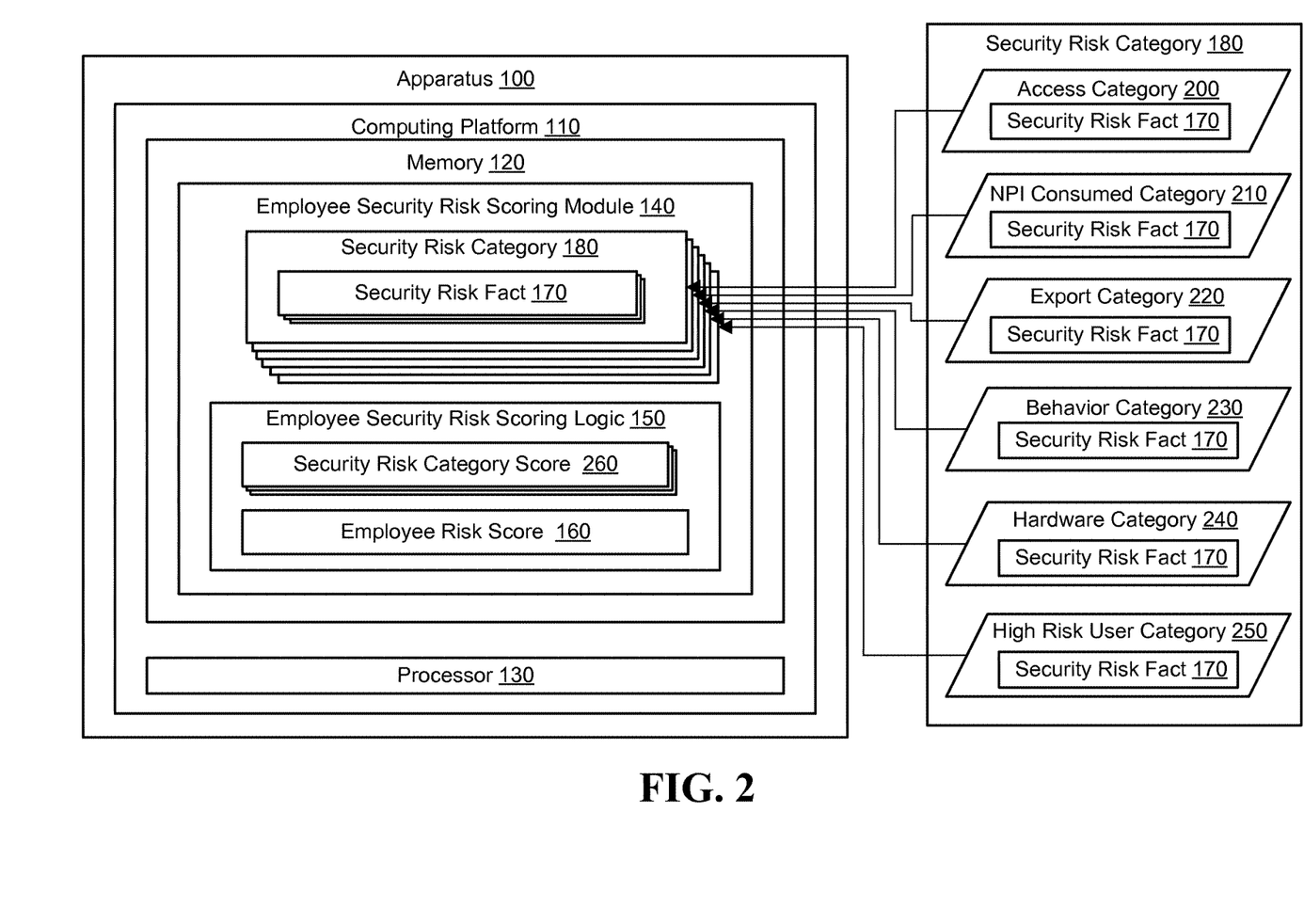
FIG. 2 is a block diagram illustrating examples of employee risk fact categories, in accordance with embodiments of the present invention.

Referring to FIG. 2, the apparatus 100 of FIG. 1 is depicted highlighting embodiments of the invention in which security risk category scores are used to determine the employee security risk score. In the example provided in FIG. 2 security risk facts 170 are associated with six different security risk categories 180. As noted, the number of categories is an arbitrary and/or dynamic number determined by the employer. An employer may predetermine and define categories based on their security risk needs. The dynamic nature of the security risk categories means that categories can be added or removed based on newly identified security threats and/or the elimination of security threats.

The exemplary security risk categories include access category 200, non-public information consumption category 210, export category 220, behavior category 230, hardware category 240 and high-risk user category 250. Access category 200 includes security risk facts 170 related to an employee's ability to access non-public (i.e., private) information (NPI), such as customer information, e.g., account balances, social security numbers and the like. For example, in most instances, customer service representatives or the like have access to non-public information. Non-Public Information (NPI) consumption category 210 includes security risk facts 170 related to the amount of NPI viewed/consumed in a predetermined time period, such as within a month or the like. Each instance in which NPI is viewed/consumed may constitute a security risk fact 170. In addition, NPI may be classified in terms of a security risk (e.g., Type I NPI, Type 2 NPI, etc.) and the classification may constitute weighting of the viewing/consumption instance. Hence, access to the NPI, is generally a pre-requisite to NPI consumption.

Export category 220 includes security risk facts 170 related to the employee's ability to export data from a employee device, such as an employer's personal computer (PC), an employer's server or the like, to an external source or device, such as a Universal Serial Bus (USB) mass storage device, such as a jump drive or the like, a Compact Disk (CD) or any other external source/device.

Behavior category 230 includes a plurality of triggering events or behaviors that are deemed to cause for a security risk. In specific embodiments, such events/behaviors may be tracked by a third party application or the like. Examples of such behaviors/events may include, but are not limited to, attempts to email social security numbers, attempts to avoid proxy controls, use of unauthorized software or devices or any other suspicious activities.

Hardware category 240 includes risk security facts 170 related to the volume of machines/devices encountered by the employee within a predetermined time period, such as a month or the like and the security risk posed by the machines/devices encountered. In specific embodiments, the security risk posed by the machines/devices may be defined in terms of a hardware risk score for the machines/devices in question. Machines/devices that pose a security risk may be non-compliant with security policies or any other device/machine that may compromise security and/or privacy. In certain embodiments, each machine/device encounter is defined as a security risk fact and the security posed by the machine/device may determine a weighting factor.

High-risk user category 250 includes risk security facts 170 related to an employee's presence on an internal high-risk user list and/or watch list. In such embodiments, each instance of the employee's presence on such a list may define a risk security fact and weighting of the fact may occur based on the security significance of the list. In addition, the high-risk user category 250 may serve as a catch-all category that includes any other security risk facts not associated with another security risk category. It should be noted that any other category may be deemed as the catch-all category or the catch-all category may be a stand-alone category.

The security risk facts 170 associated with each of the security risks categories 180 are received by the employee security risk module 140. In certain embodiments, the security risk facts 170 may be received in real-time (i.e., proximate in time to the event, behavior, instance or the like associated with the security risk fact 170), such that the employee risk score may be determined in real-time. The employee risk module 140 may be configured to consolidate the received security risk facts 140 into respective security risk categories 180 and reformat the security risk facts 140 into a standard format, prior to the employee security risk scoring logic 150 determining a category security risk score 260 for each of the predetermined security risk categories 180.

Figure 3:
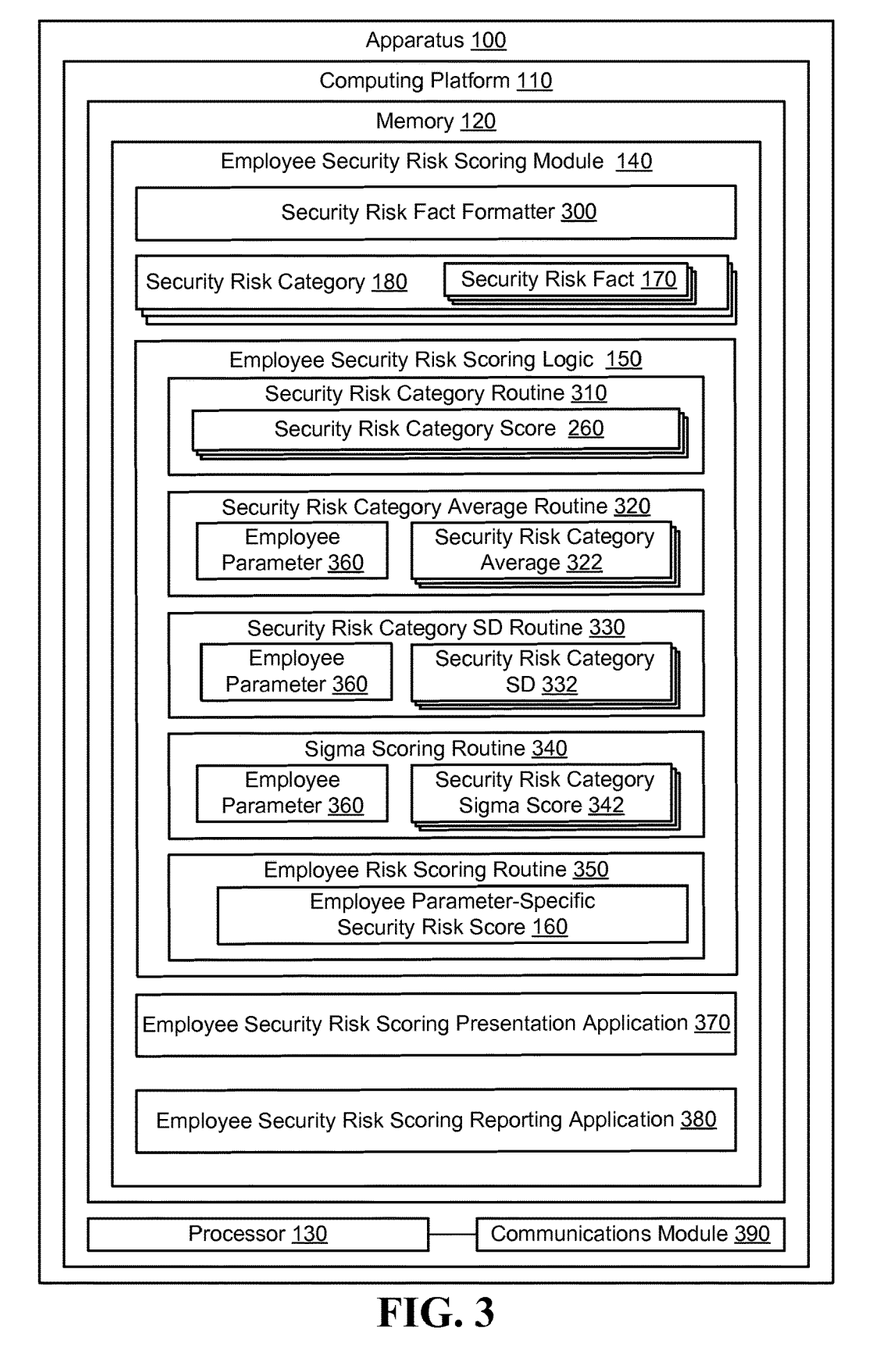
FIG. 3 is a detailed block diagram of an apparatus for quantifying employee security risk, in accordance with another embodiment of the invention.

FIG. 3 provides a more detailed depiction of an apparatus 100, according to further embodiments of the present invention. In addition to providing greater detail, FIG. 3 highlights various optional components/embodiments not shown in FIGS. 1 and 2. The apparatus 100 may include any type and/or combination of one or more computing devices, such as servers, personal computers, or the like. The apparatus 100 includes computing platform 110 that is operable to receive and execute modules, routines and applications, such as employee security risk scoring module 140 or the like. Computing platform 110 includes memory 120, which may comprise volatile and nonvolatile memory such as read-only and/or random-access memory (RAM and ROM), EPROM, EEPROM, flash cards, or any memory common to computing platforms. Further, memory 120 may include one or more flash memory cells, or may be any secondary or tertiary storage device, such as magnetic media, optical media, tape, or soft or hard disk.

Further, computing platform 110 also includes processor 130, which may be an application-specific integrated circuit ("ASIC"), or other chipset, processor, logic circuit, or other data processing device. Processor 130 or other processor such as ASIC may execute an application programming interface ("API") layer that interfaces with any resident programs, such as employee security risk scoring module 140 or the like, stored in the memory 120 of apparatus 100.

Additionally, processor 120 includes various processing subsystems embodied in hardware, firmware, software, and combinations thereof, that enable the functionality of apparatus 100 and the operability of the apparatus on a network. For example, processing subsystems allow for initiating and maintaining communications, and exchanging data, with other networked devices. It should be noted that any of the modules, sub-modules, applications, logic and routines shown and described as being in memory 120 may alternatively be embodied in processing subsystems.

The memory 120 of apparatus 100 includes the aforementioned employee security risk scoring module 140, which includes employee security risk scoring logic 150 configured to determine an employee security risk score 160 based on received security risk facts 170.

The employee security risk scoring module 140 is configured to receive security risk facts 170. As previously discussed in relation to FIG. 2, the security risk facts 170 may be associated with a predetermined security risk category 180. Additionally, employee security risk scoring module 140 may additionally include security risk formatter 300 configured to format security risk facts and other data, such data received from human resources datastores or the like, in a standard format. In certain embodiments, the formatter 300 may be configured to provide a standard format to employee hierarchy data, such as job title, business unit or the like; employee identifier/number; security risk category; security risk facts; security risk category score and the like.

The employee security risk logic 150 may include security risk category routine 310, security risk category average routine 320, security risk category standard deviation routine 330, sigma scoring routine 340 and employee security risk scoring routine 350. The security risk category score routine 310 is configured to determine security risk category scores, otherwise referred to as a raw category scores, for the plurality of security risk categories 180. In certain embodiments, the category security risk score is determined by aggregating all of the security risk facts 170 within the security risk category.

The security risk category average routine 320 and the security risk category standard deviation routine 330 are configured to determine a category average 322 and a standard deviation 332 for each predetermined security risk category 180. Additionally, the category average 322 and the category standard deviation 332 are determined for the group of employees that meet the predetermined employee parameter 360 of interest. For example, if the employee parameter 360 of interest is a level of hierarchy within the business, such as business unit or job title, then the category average 322 and the category standard deviation 332 are determined for the group of employees within the predetermined level of hierarchy within the business, such as business unit or job title. Thus, the employee parameter 360 defines the dimension on which employee security risk scores are defined. The logic 150 may be configured such that one or more employee parameters 360 are predefined within the logic and routine or the logic 150 may be configured to allow for a user to select or otherwise define the employee parameter 360 dynamically. Additionally, the category average 322 and the category standard deviation 332 may rely on the most current security risk facts and, thus, the most current security risk category scores of the employees meeting the predetermined employee parameter 360, to ensure that the category average 322 and the category standard deviation 332 reflect data consistent with employees current security risk category scores 260.

The sigma scoring routine 340 is configured to determine security risk category sigma scores 342 based on the security risk category scores 260, the security risk category average 322, the security risk category standard deviation 332 and the employee parameter 360 used to define the group of employees included in the category average and standard deviation determinations. In specific embodiments, the sigma score 342 is defined by subtracting the security risk category average 322 from the security risk category score 260 and dividing the remainder by the security risk category standard deviation (i.e., (security risk category score—security risk category average)/security risk category standard deviation). It should be noted that if the security risk category standard deviation 332 is determined to be zero, or effectively zero, meaning the population of employees defined by the employee parameter 360 have the same security risk category score, the sigma scores 342 may be set to zero.

The employee risk scoring routine 330 is configured to determine an employee-parameter-specific security risk score 160. In specific embodiments, the security risk score 160 is determined by aggregating the positive-valued security risk category sigma scores 342. Positive valued sigma scores/deviations are scores that exceed the category average score and, thus, highlight elevated security risks. By eliminating the negative valued sigma scores/deviations (i.e., scores that are below the category average score) from the overall employee security risk score 160, spurious score degradation is avoided. The aggregation may include applying a predetermined weight to the sigma score of each category based on the significance of the security risk category 180 in determining the employee parameter-specific security risk score 160.

The employee security risk scoring module 140 may additionally include employee security risk scoring presentation application 370 and/or employee security risk scoring reporting application 380. The presentation application 370, which may be a Graphical User Interface (GUI) application or the like, provides for dynamically presenting, via a network connection, the employee security risk scores for the purpose of having a user/employer track the security risk of employees in terms of their respective security risk scores for the designated employee parameter 360. In this regard, over time, the user/employer can track whether an employee is providing more or less of a security threat than previously determined. In addition the presentation application 370 may be configured to allow a user to select/define an employee parameter 360 and for the module 140 to determine employee security risk scores 160 for the employees defined by the employee parameter.

The employee security risk reporting application 380 may be configured to automatically, such as on a predetermined schedule or by user request, generate either a predetermined or a dynamic employee security risk report. The report may indicate employees that are determined to pose security risks based on their scores exceeded a predetermined threshold or the like, trends in employee security risk scores and the like. Once generated, the reporting application 380 may initiate communication of the reports, via email or the like, to designate individuals or entities within the business via communications module 390.

Figure 4:
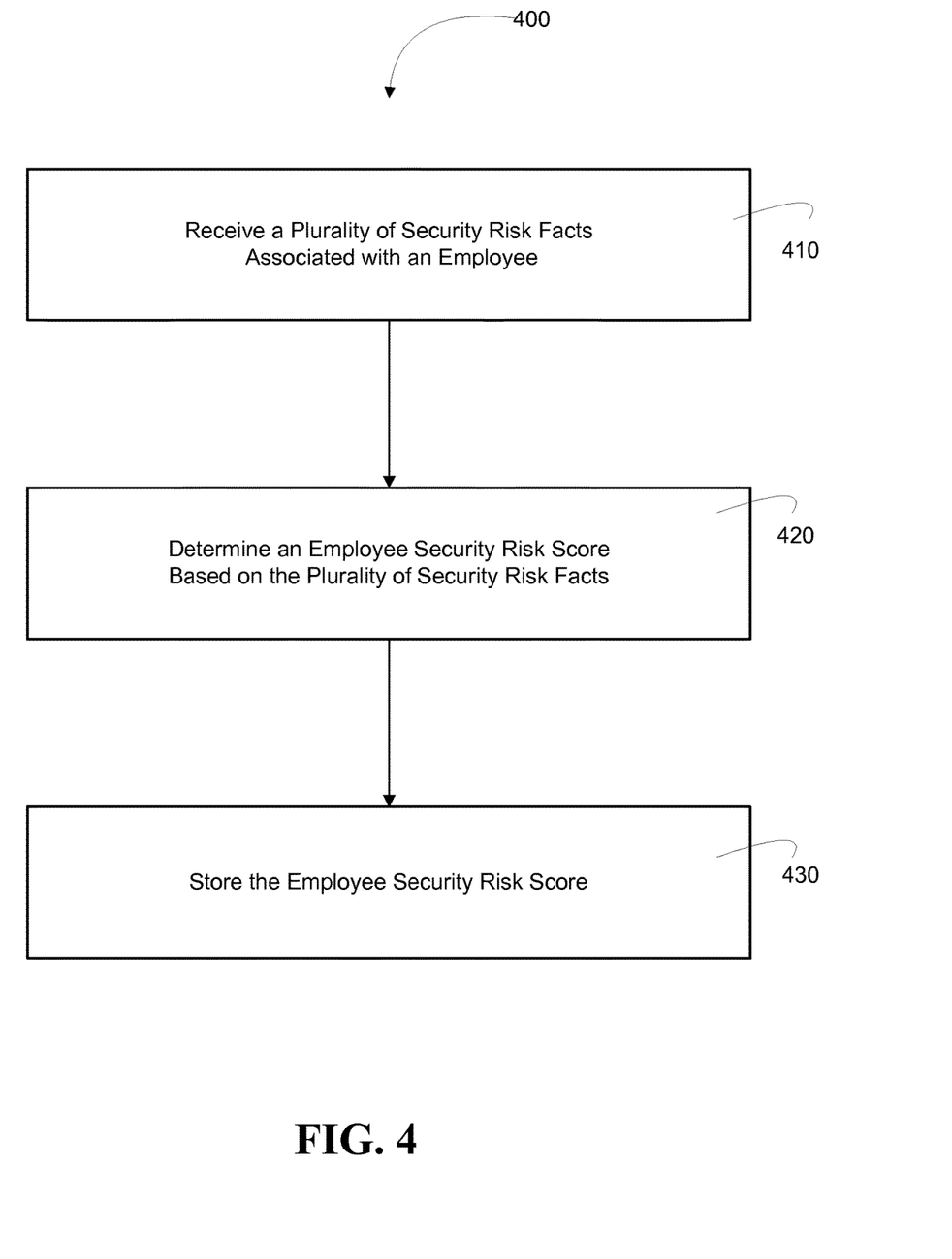
FIG. 4 is a flow diagram of a method for quantifying employee security risk, in accordance with embodiments of the present invention.

Turning the reader's attention to the flow chart of FIG. 4, a method 400 is provided for quantifying employee security risk, in accordance with embodiments of the present invention. At Event 410, a computing device receives a plurality of security risk facts associated with an employee. It should be noted that while the method is directed to quantifying employee security risk for a single employee, in practice, the method is typically implemented to determine an employee security risk score (i.e., quantify employee security risk) for a group of employees defined by a predetermined employee parameter. The predetermined employee parameter may be a level of hierarchy within the business, such as a business unit, a job title or the like, or the employee parameter may be any other characteristic that defines a group of employees, such as geographic location/country, salary, length of employment or the like.

In certain embodiments, the security risk facts are associated with a security risk category. The security risk categories are subsequently individually scored for security risks and provide for vectors in the determination of an employee's overall security risk score. The number and type of security risk categories and security risk facts within a category may be arbitrary based on employer security concerns. In addition, the security risk categories and the facts within a category may be dynamic in nature, such that categories may be added based on new security risks and/or deleted based on a risk no longer existing or no longer posing a threat. In the example provided in FIG. 2 security risk categories may include, but are not limited to, access category, NPI consumption category, behavior category, ability to export category, hardware encountered category, and high risk user/miscellaneous category.

At Event 420, an employee security risk score is determined for the employee based on the plurality of security risk facts. As noted above, in accordance with specific embodiments of the method, the employee security risk score is additionally determined based on a predetermined employee parameter. Determination of the employee security risk score based on a predetermined employee parameter ensures that the risk score is normalized across a segment of the employee population defined by the employee parameter. For example, if the predetermined employee parameter is a job title, the resulting employee security risk score is in comparison to all other employee's having the same job title. This allows the employer to differentiate amongst employees in determining employee risk categories, taking into account that certain characteristics of the employee, such as level of hierarchy with the business or specific personal characteristics may be directly proportional to variances in the security risk posed by the employee.

At Event 430, the employee security risk score is stored in memory. In certain embodiments of the invention, storing the security risk score in memory includes formatting the security risk score in a standardized format. In addition, to storing the employee risk score, intermediary scores, such as security risk category scores may also be properly formatted and stored in memory. In addition, the employee security risk score may be provided to a presentation application and/or reporting application for presentation and/or reporting to designated individuals or entities within the business.

Figure 5:
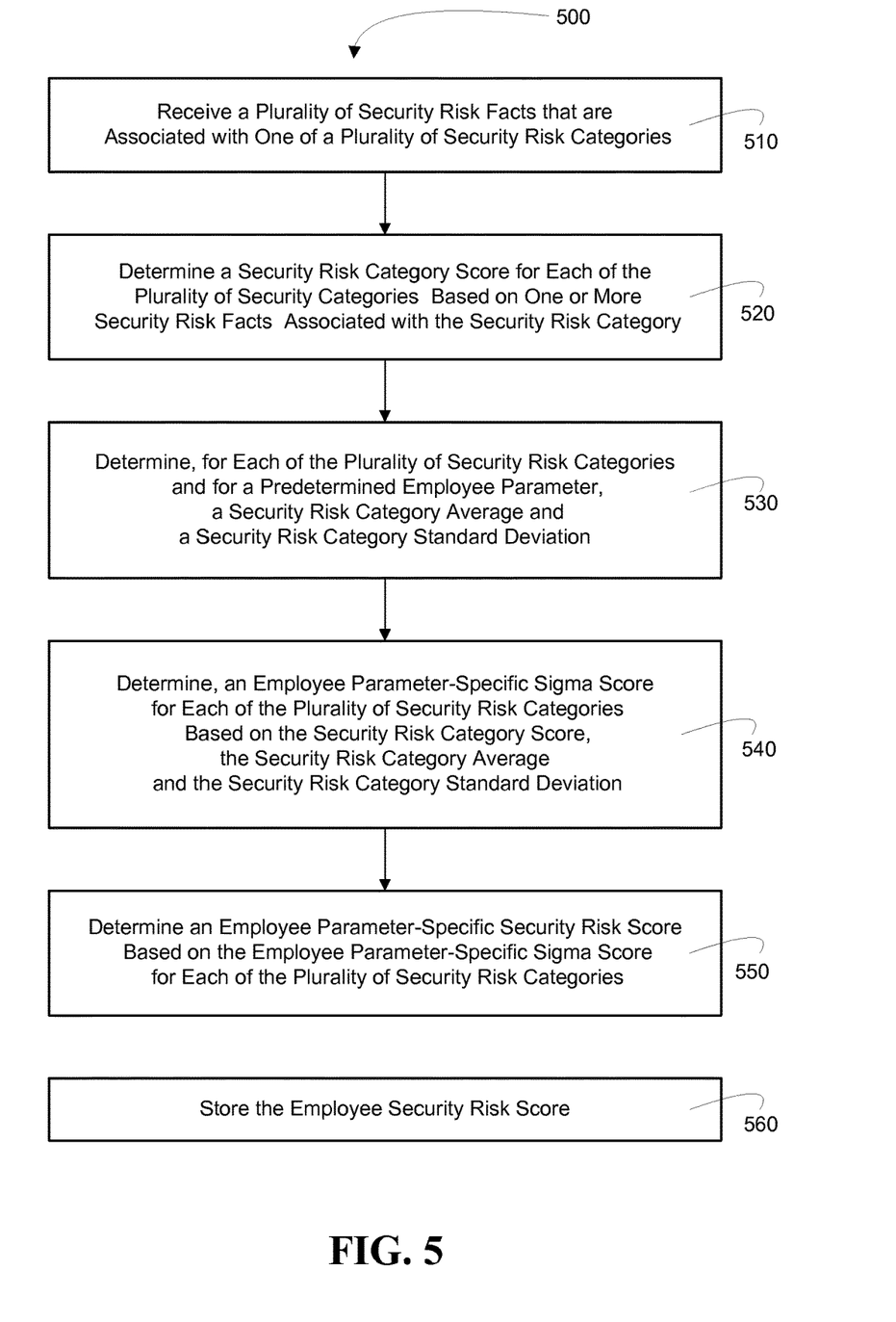
FIG. 5 is another example of a method for determining an employee security risk score, in accordance with an embodiment of the present invention.

Referring to FIG. 5, a flow diagram is presented for another method 500 for quantifying employee security risk, in accordance with other embodiments of the invention. At Event 510, a plurality of security risk facts that are associated with one of a plurality of security risk categories are received at a computing device. In one embodiment of the method, all of the security risk facts associated with a category will be received in unison, such that the computing device recognized the security risk category and processes the category and/or risks within the category accordingly. In other embodiments, in which the security risk facts are received randomly, the computing device may be configured to determine the designated category associated with the security risk fact. In addition, to receiving the security risk facts, the computing device may be configured to format the security risk facts in a standardized, employee risk scoring format. It should be noted that the standardized, common formatting of the security risk facts and the fact that the category definitions are "data driven" (i.e., the definition of the category is included in the data) provides for dynamically changing (i.e., adding or subtracting) security risk categories to the employee risk scoring process without having to make changes to the score determining process.

At Event 520, a security risk category score is determined, at a computing device processor, for each of the plurality of security risk categories based on the one or more security facts associated with the security risk category. In specific embodiments of the method, determining security category scores may entail aggregating all of the security risk facts within a category. In certain embodiments, the security risk facts within a category may be weighted to emphasize or de-emphasize the significance of a fact in terms of security risk.

At Event 530, a security risk category average and a security risk category standard deviation are determined, at a computing device processor, for each of the plurality of security risk categories and based on a predetermined employee parameter. For example, if the predetermined employee parameter is a level of hierarchy within the business, such as a specific job title, then the security risk category average and a security risk category standard deviation for that particular job title. As previously noted, the computing device processor may be configured to determine security risk category average and a security risk category standard deviation for one or more employee parameters, or a user/employer may dynamically select/define an employee parameter on an as-needed basis to determine security risk category average and a security risk category standard deviation and, subsequently, employee security risks scores for the selected/defined employee parameter.

At Event 540, employee parameter-specific sigma scores are determined, at a computing device processor, for each of the plurality of security risk categories based on the security risk category score, the security risk category average and the security risk category standard deviation. Thus, the sigma score may be defined by subtracting the security risk category average from the security risk category score and dividing the remainder by the security risk category standard deviation.

At Event 550, an employee parameter-specific security risk score is determined, at a computing device processor, based on the employee parameter-specific sigma score for each of the plurality of security risk categories. In one embodiment of the invention, determining the employee security risk score provides for aggregating all of the positive-valued sigma scores. As previously noted, positive-valued sigma scores reflect a security risk that is above average for the designated employee parameter. Negative-valued sigma scores reflect a security risk that is below average for the designated employee parameter. By excluding the negative-valued sigma scores from the overall employee security risk scores, the score is more reflective of actual security risks. Additionally, the security risk for each category may be weighted based on the significance of each security risk category for the overall employee security risk score. At Event 560, the employee security risk score is stored in computing device memory.

The reader should note that Events 520-550 are performed consistently, regardless of the risk categories or the employee parameter/hierarchy used to determine the employee risk score. By performing these events in the same manner regardless of the risk categories or the employee parameter/hierarchy, the system herein disclosed is a highly flexible system that can easily be adapted to dynamically accommodate category changes, employee parameter/hierarchy changes or the like. In this regard, new emerging categories and/or employee parameter/hierarchy changes can be automatically factored in as employee risk scores are being determined, making system configuration changes and/or software modifications unnecessary to accommodate the new categories and/or employee parameter/hierarchy changes.

Figure 6:
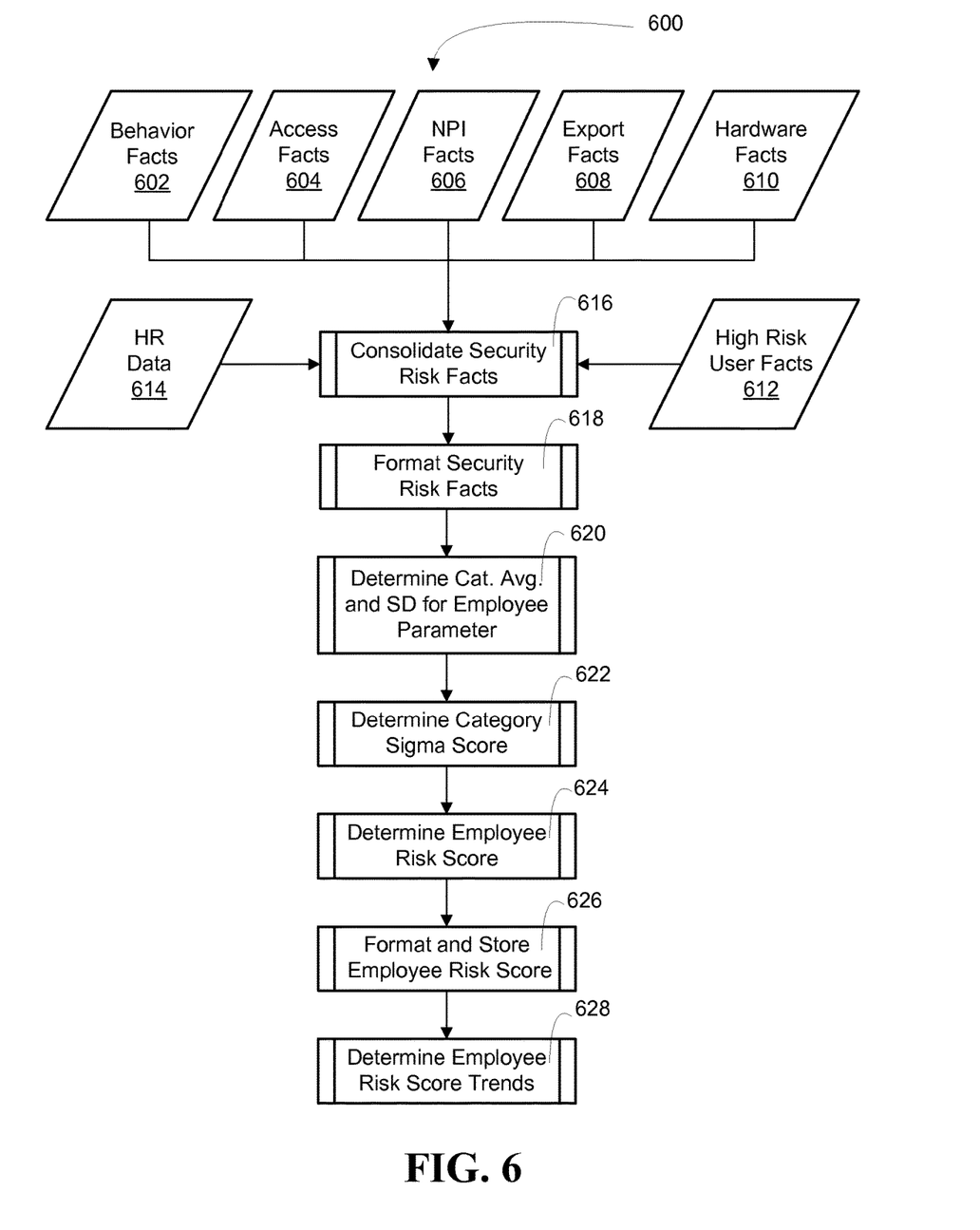
FIG. 6 is a further example of a method for quantifying and tracking employee security risk, in accordance with embodiments of the present invention.

Referring to FIG. 6 another flow diagram is depicted of a method 600 for determining employee security risk scores, in accordance with embodiments of the present invention. At Event 616, the security risk facts are received and consolidated. The security risk facts may include, but are not limited to, behavior category facts 602, access category facts 604, NPI consumption category facts 606, export category facts 608, hardware category facts 610 and high risk user category facts 612. Behavior category facts 602 may include security event case data, which may be captured by a third party application. One such application is provided for by ArcSight Incorporated of Cupertino, Calif. Access category facts 604 may be captured via access control lists or the like. NPI consumption category facts 606 may be captured from customer representative/associate logs or the like. Export category facts 608 may be captured external device write permission lists or the like. Hardware category facts 610 may be captured from device logs and the risk score associated with the devices. High risk user category facts 612 may be captured form internal lists and may include assertions of high risk from external systems.

In addition to security risk facts, human resources data 614 is received and consolidated that includes level of hierarchy data, such as business unit associated with employees, job titles of employees and other identifying employee characteristics that may define employee parameters.

Consolidation of security risk facts may include aggregating facts based on category to result in a security risk category score. Additionally, consolidation may include determining which facts belong to which category prior to aggregating the facts to result in the risk category score. In other embodiments, consolidation may include determining and eliminating fact redundancies. Additionally, consolidation may include weighting security risk facts to take into account the significance of facts in relation to security risk.

At Event 618 the security risk facts and other received employee data are formatted in a standard common format. The standardized common format allows for the import of security risk facts from many disparate, external sources. These external sources include, but are not limited to, human resources data, active directory data, application access control list data and the like. In addition, the standard common format allows for implementation by various third party or internal aggregation and reporting applications. At Event 618, data to be formatted may include, but is not limited to, employee identifiers, such employee numbers or the like; level of hierarchy data, such as business unit, job titles and the like; risk categories; specific security risk facts; security risk category scores; reference sets identified by the URL and risk fact data, such as identifiers for hardware accessed or the like.

At Event 620, security risk category averages and security risk category standard deviations are determined for each predetermined category and the employee parameter of note. For example, if the employee parameter is job titles, then security risk category averages and security risk category standard deviations are determined for the each predetermined category and for each job title.

At Event 622, security risk category sigma scores are determined based on the security risk category scores, security risk category averages and security risk category standard deviations. The security risk category sigma score may be defined by subtracting the security risk category average from the security risk category score and dividing the remainder by the security risk category standard deviation. At Event 624, an employee security risk score is determined by aggregating the positive-valued sigma scores.

At Event 626, resulting data is formatted in the standardized, common format and store in associated files. The resulting data may include, but is not limited to, the security risk category averages, the security risk category standard deviations, the security risk category sigma scores, the employee security risk scores and related reference sets.

At Event 628, employee risk score trends are determined based on employee security risk scores. Trending is defined as a snapshot of employee risk scores based on a predetermined employee parameter, such as within an employee hierarchy, such as job title, cost center or the like. The trend data is assembled and a data is appended to each trend data record, so that similar trend data records for different periods of time can be compared. Trending can be accomplished at the raw risk data level, thereby allowing for re-trending if the risk scoring logic is changed. Trending can also be accomplished at the summary level, however re-trending is not allowed at the summary level if risk scoring logic is changed.

Figure 7:
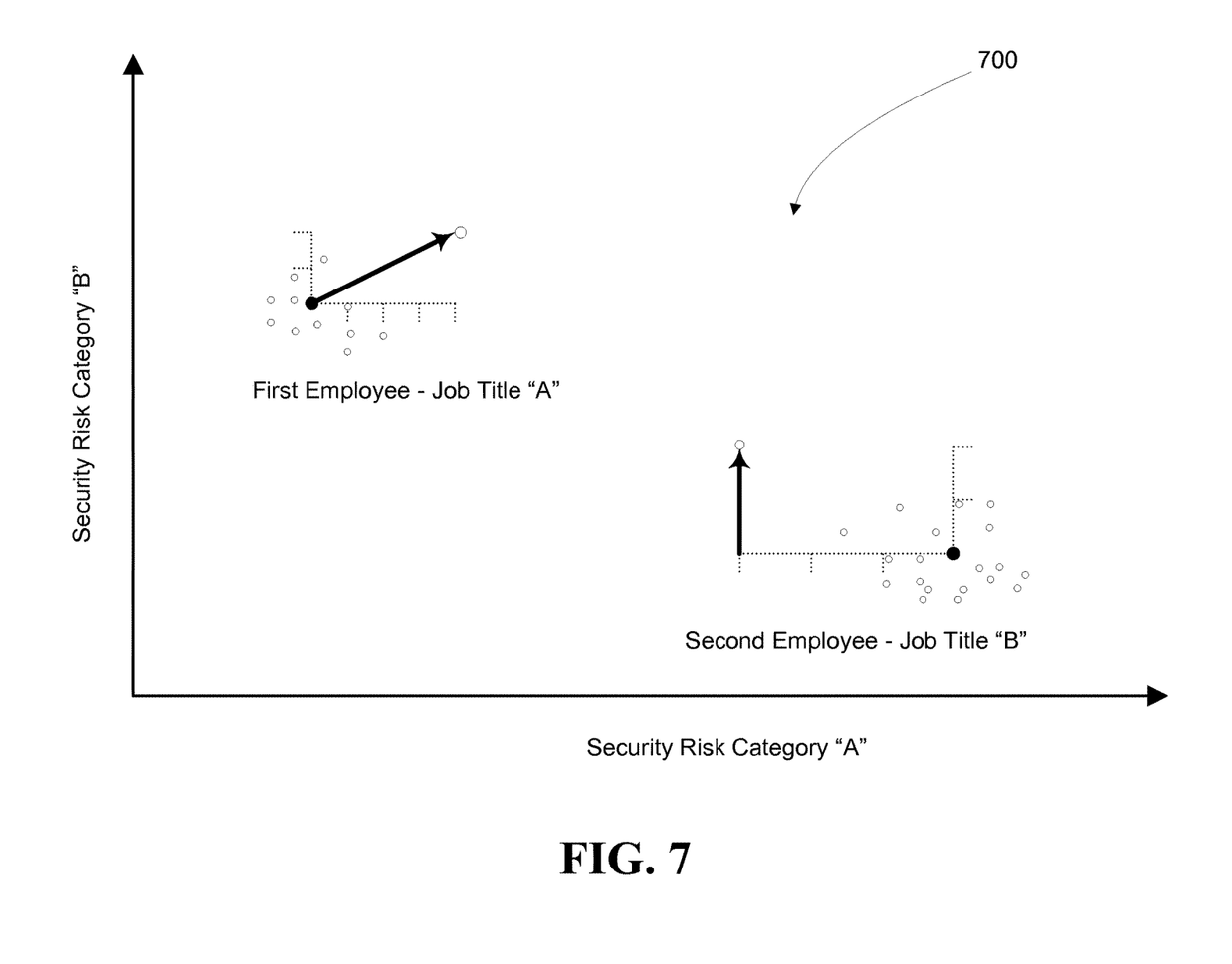
FIG. 7 is a line graph depicting employee security risk scores for two employees having different job title, in which the score is based on two security risk categories; in accordance with embodiments of the present invention.

FIG. 7 is an X-Y graph illustrating employee security risk score, in accordance with an embodiment so the invention. In the illustrated example, for simplification purposes, the employee risk score is based on two security risk categories, otherwise referred to as security risk components or vectors. The two security risk categories are defined generically as security risk category "A", shown along the X-axis and security risk category "B", shown along the Y-axis. Additionally, graph illustrates an employee risk score for two different employees that have different employee parameters. In this example, the employee parameter is defined as a level of hierarchy within the business, specifically job title. The first employee shown in the upper left-hand corner of the graph is generically defined as having job title "A" and the second employee shown in the bottom right-hand corner of the graph is generically defined as having job title "B". The bold circle represents job title average and the un-filled circles represent raw security risk scores for other employees having the same job title.

First employee having job title "A" exceeds job title average by 4 sigma levels in security risk category "A" and by 2 sigma levels in security risk category "B". Hence, since both security risk category scores are positive-valued, the overall employee security risk score for the first employee is six (4+2=6).

Second employee having job title "B" exceeds job title average by 2 sigma levels in security risk category "B", however, second employee's category "A" risk is below average, specifically 3 sigma levels below average, and therefore the negative-valued category score is not considered towards the overall employee security risk score. Hence, the overall employee security risk score for the second employee is two (2).

Although both employees appear to graphically be equal distance from their respective job title averages, the first employee has a significantly higher security risk score (6) than the second employee (3), due to the fact that for the second employee security risk category "A" is below average or negative-valued and, therefore not counted in the overall employee security risk score.

The normalization effect of the sigma scores should also be noted. Security risk category "A" sigma levels for job title "B" employees are much larger than for job title "A" employees, due to the higher variation of raw scores within the job title "B" group Thus, systems, apparatus, methods, and computer program products herein described provide an employee security risk score. The score allows employers to identify and track employees that pose a threat for internal security violations. The proposed scoring system provides a simplistic and highly normalized approach to gauging an employee's security risk. The system provides for real time update of employee's security risk score based on real-time receipt of security risk facts associated with the employee. In addition, according to certain embodiments, the security risk score is presented as an extensible composite vector that supports an arbitrary number of risk categories. As such as new security threats are identified, warranting new risk categories, the risk categories can be readily added to the composite vector without negatively impacting the overall scoring system.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. An apparatus for quantifying employee security risk, the apparatus comprising:
   a computing platform including at least one processor and a memory;
   an employee security risk scoring module that is stored in the memory, executable by the processor, configured to:
      receive a plurality of security risk facts, each fact associated with one of a plurality of employees, wherein one or more of the security risk facts are received within real-time of an event associated with a security risk fact,
      consolidate the plurality of security risk facts to (1) determine one of a plurality of security risk categories to assign to each of the security risk facts, and (2) determine security risk facts that are redundant and remove the redundant risk facts from further employee risk score processing, wherein the security risk categories include (1) access to non-public information, (2) volume of non-public information consumed within a predetermined time period, (3) ability to export data, (4) behaviors associated with a security risk and (5) volume of hardware accessed within a predetermined time period, and
      transform the plurality of security risk facts to a standard format prior to the employees security risk score processing;
   an employee security risk scoring logic configured to determine an employee security risk score for each of the employees that meet a predetermined employee parameter, based on the plurality of security risk facts, wherein the employee security risk scoring logic further comprises:
      a security risk category scoring routine configured to determine, for each of the employees that meet the employee parameter, an employee-specific security risk category score for each of the plurality of security risk categories,
      a security risk category average routine configured to determine a security risk category average for each of the plurality of security risk categories and for the employees that meet the predetermined employee parameter,
      a security risk category standard deviation routine configured to determine a security risk category standard deviation for each of the plurality of security risk categories and for the employees that meet by a predetermined employee parameter,
      a sigma scoring routine configured to determine a sigma score, which is specific to the employee parameter, for each of the security risk categories, wherein the sigma score is determined by subtracting the security risk category average from the security risk category score to result in a remainder and dividing the remainder by the security risk category standard deviation, and
      an employee risk scoring routine configured to determine, for each of the employees that meet the employee parameter, the employee security risk score by aggregating all positive-valued sigma scores for each of the security risk categories;
   a graphical user interface module configured to dynamically display, via a network connection, employee security risk scores for each of the employees, to thereby providing tracking a security risk of employees in terms of their respective security risk scores for the predetermined employee parameter;
   a security risk reporting application configured to automatically generate a dynamic employee security risk report indicating employees that are determined to pose security risks based on their scores exceeding a predetermined threshold; and
   a reporting application configured to initiate communication of the report to a remote electronic device.

2. The apparatus of claim 1, wherein the employee security category routine is further configured to aggregate the security risk facts associated with a security risk category to determine the security risk category score.

3. The apparatus of claim 1, wherein the employee security risk scoring module further comprises a security risk fact weighting mechanism configured to apply a predetermined weighting factor to one or more of the security risk facts based on security risk significance prior to determining the security risk category score.

4. The apparatus of claim 1, wherein the employee risk scoring logic is further configured to apply a predetermined weighting factor to each of the positive-valued parameter-specific sigma scores, wherein the predetermined weighting factor is based on the significance of the security risk category associated with the sigma score in determining the employee risk score.

5. The apparatus of claim 1, wherein the plurality of risk categories include (6) high-risk user indicators.

6. The apparatus of claim 1, wherein the employee security risk scoring module is further configured to provide for dynamic user-addition or user-subtraction to the plurality of security risk categories without requiring change to the employee security risk scoring logic.

7. The apparatus of claim 1, wherein the predetermined employee parameter is further defined as a level within an employer hierarchy.

8. The apparatus of claim 7, wherein the predetermined employee parameter is further defined as one of job title or business unit.

* * * * *